D. C. PUDERBAUGH.
APPARATUS FOR MEASURING LIQUIDS.
APPLICATION FILED FEB. 15, 1907.
974,915.
Patented Nov. 8, 1910.
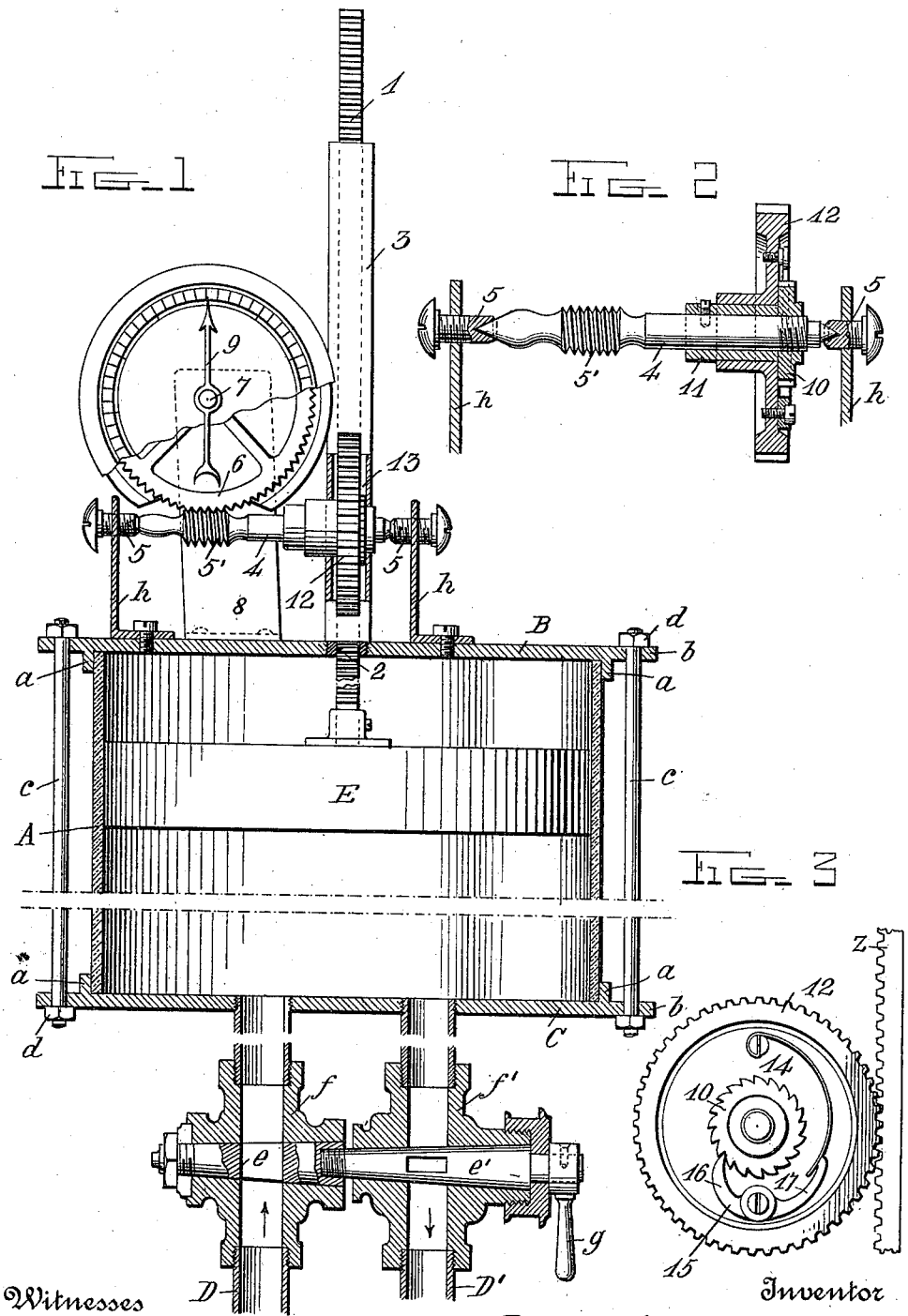

UNITED STATES PATENT OFFICE.

DAVID C. PUDERBAUGH, OF HUNTINGDON, PENNSYLVANIA.

APPARATUS FOR MEASURING LIQUIDS.

974,915.  Specification of Letters Patent.  Patented Nov. 8, 1910.

Application filed February 15, 1907. Serial No. 357,521.

*To all whom it may concern:*

Be it known that I, DAVID C. PUDERBAUGH, a citizen of the United States, residing at Huntingdon, in the county of Huntingdon and State of Pennsylvania, have invented certain new and useful Improvements in Apparatus for Measuring Liquids, of which the following is a specification.

My invention relates to an apparatus for holding liquid and automatically measuring the same as it is drawn off from the holder or receptacle.

The main object of my invention is to provide a simple, durable, economical and accurate device, which will register the quantity of liquid drawn off from a liquid receptacle until said receptacle or holder is entirely emptied.

My invention consists in the combination, arrangement and location of parts hereinafter more fully described and pointed out in the appended claims.

In the accompanying drawings forming a part of this specification:—Figure 1 represents a view in elevation of the apparatus embodying my invention, showing the liquid receptacle and the liquid inlet and outlet connections in section, and Figs. 2 and 3 represent detail views of parts of the registering mechanism.

Having special reference to the drawings of the invention, like letters and numerals of reference are employed to designate corresponding parts.

A, represents a receptacle or holder for the liquid, and it is adapted to hold any desirable quantity. This receptacle is preferably made of glass in the form of a cylinder and is provided with a top or cover B, and a bottom C, both the top and bottom being provided with integral projecting flanges $a$ which rest flush against the upper and lower exterior portions of the cylindrical receptacle, and the top and bottom are each provided with a perforated portion $b$ extended beyond the glass receptacle, adapted to receive threaded bolts $c$, provided with nuts $d$, at each end, whereby the top and bottom are securely clamped against the upper and lower edges of the receptacle. Leading from the bottom C, and secured thereto, are the inlet and outlet pipes D, D', respectively, each provided with a suitable valve $e$, $e'$, carried by and secured in any desirable manner to the valve casings $f$, $f'$. These valves $e$ and $e'$ are so secured together that when the handle $g$, fastened to the valve $e'$, is partially rotated in either direction one of the valves will be opened and the other closed.

Within the receptacle A, is a float E, to which is secured at the central portion thereof, a toothed upright bar or rack 1, the latter passing through an aperture 2, in the receptacle cover, and upward and through a slotted casing 3, the latter being suitably secured to the said receptacle cover.

At a suitable distance above the cover B is supported, by means of brackets $h$ secured to said cover, a shaft 4, provided with cone-shaped ends resting in the adjustable bearings 5 also carried by said brackets $h$. Formed on this shaft 4, is a worm 5', adapted to engage with the worm wheel 6, connected to an indicating pointer 9, the wheel 6 and pointer 9 being supported by a shaft or pin 7 mounted in the bracket 8, the latter being fastened to the upper surface of the receptacle cover B. Carried by the said bracket 8, is a casing provided with a graduated dial, outside of which is a pointer 9 supported by said pin or shaft 7, for recording or indicating in connection with said dial, the quantity of liquid drawn off from the liquid receptacle. Secured to the shaft 4, near one end thereof, is a sleeve 11, and to the right-hand end of said shaft 4 is secured a ratchet-wheel 10, and surrounding the latter is a loose gear-wheel 12 adapted to engage the rack-bar 1, at the point 13 as the rack-bar is moved up or down as will be readily understood by reference to Fig. 1 of the drawings. Secured to the loose gear wheel 12, at one side thereof, is a spring 14, and a pawl 15, the latter having arms 16 and 17, one arm engaging with the ratchet-wheel 10, and the other with the free end of the spring 14, (see Figs. 2 and 3) the said worm-wheel 12, ratchet-wheel 10, spring 14 and pawl 15, being so arranged with relation to each other that, when the receptacle is being emptied and the rack-bar is moving in a downward direction, the shaft 4 will be caused to rotate, and through the medium of the worm 5', worm-wheel 6, dial and pointer, the quantity of liquid drawn off from the receptacle will be properly recorded.

From the foregoing description the construction and operation of the various parts will be readily understood.

It will be obvious that slight changes may be resorted to in the specific construction of the parts hereinbefore referred to without departing from the spirit and scope of my invention.

Having thus described my invention what I claim and desire to secure by Letters Patent is:—

1. An apparatus for measuring liquids, comprising a liquid receptacle, a flanged cover for said receptacle, a piston within the receptacle, indicating means connected to and supported by the cover, means for supporting said indicating means above the cover, an inlet pipe and an outlet pipe secured to the bottom of the receptacle, a valve within the inlet and a valve within the outlet pipe, said inlet and outlet valve being connected with each other, a slotted casing connected to and supported by said flanged cover, a transversely arranged shaft adjustably supported above said cover, means for supporting said shaft above the cover, a gear wheel carried by said shaft, means on said shaft for operating the indicating mechanism, and a rack-bar passing through the slotted casing and secured to the piston and adapted to engage with the said gear-wheel, substantially as described.

2. An apparatus for measuring liquids including a liquid receptacle having a glass body, a removable metal top, a removable metal bottom, a plurality of threaded rods or bolts passing through both the top and bottom, a valved inlet and a valved outlet pipe connected to the bottom, a piston within the receptacle, indicating mechanism supported by the said top, means for supporting said indicating means above the cover, a slotted casing connected to and supported by said top and passing through said casing, a transversely arranged shaft adjustably supported above said top, means for supporting said shaft above the top, a gear wheel carried by said shaft, means on said shaft for operating the indicating mechanism, and a rack-bar secured to the piston and adapted to engage with the said gear-wheel.

3. An apparatus for measuring liquids comprising a liquid receptacle, a cover secured to said receptacle, a valved inlet and a valved outlet pipe connected to the bottom of the receptacle, a piston within the receptacle, a rack secured to the piston, an upright slotted casing secured to said receptacle cover and surrounding said rack, a gear-wheel engaging the rack, a shaft supporting said gear-wheel, and a worm on said shaft, and means operated by said worm for indicating the quantity of liquid drawn off from the liquid receptacle.

DAVID C. PUDERBAUGH.

In presence of—
  H. J. GOODMAN,
  H. U. G. CARLIN.